C. T. B. SANGSTER.
CHANGE SPEED AND BACK PEDALING BRAKE MECHANISM FOR CYCLES.
APPLICATION FILED JAN. 2, 1907.
931,656.
Patented Aug. 17, 1909.
6 SHEETS—SHEET 2.
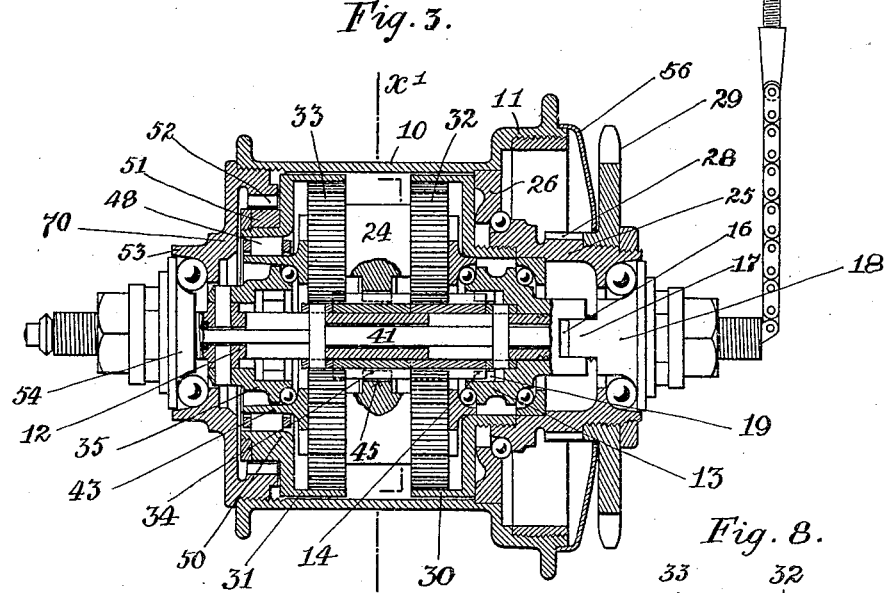
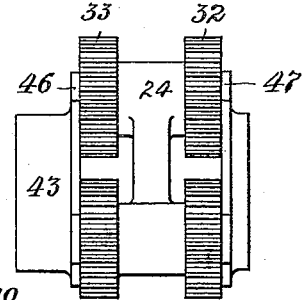
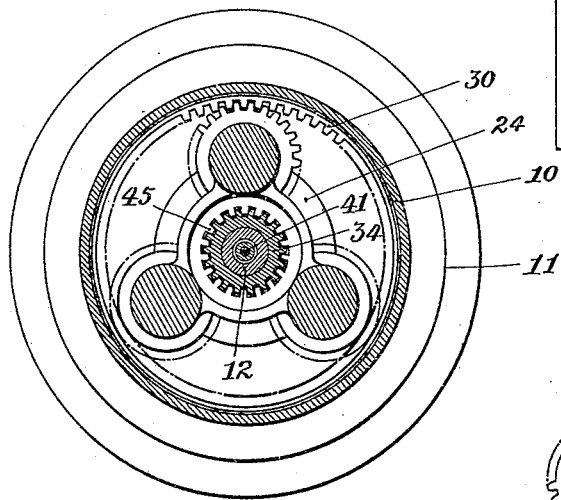
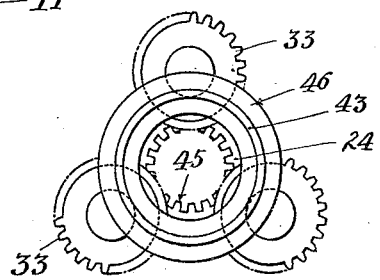
WITNESSES
Inventor
Charles T. B. Sangster
By
James L. Norris
Atty

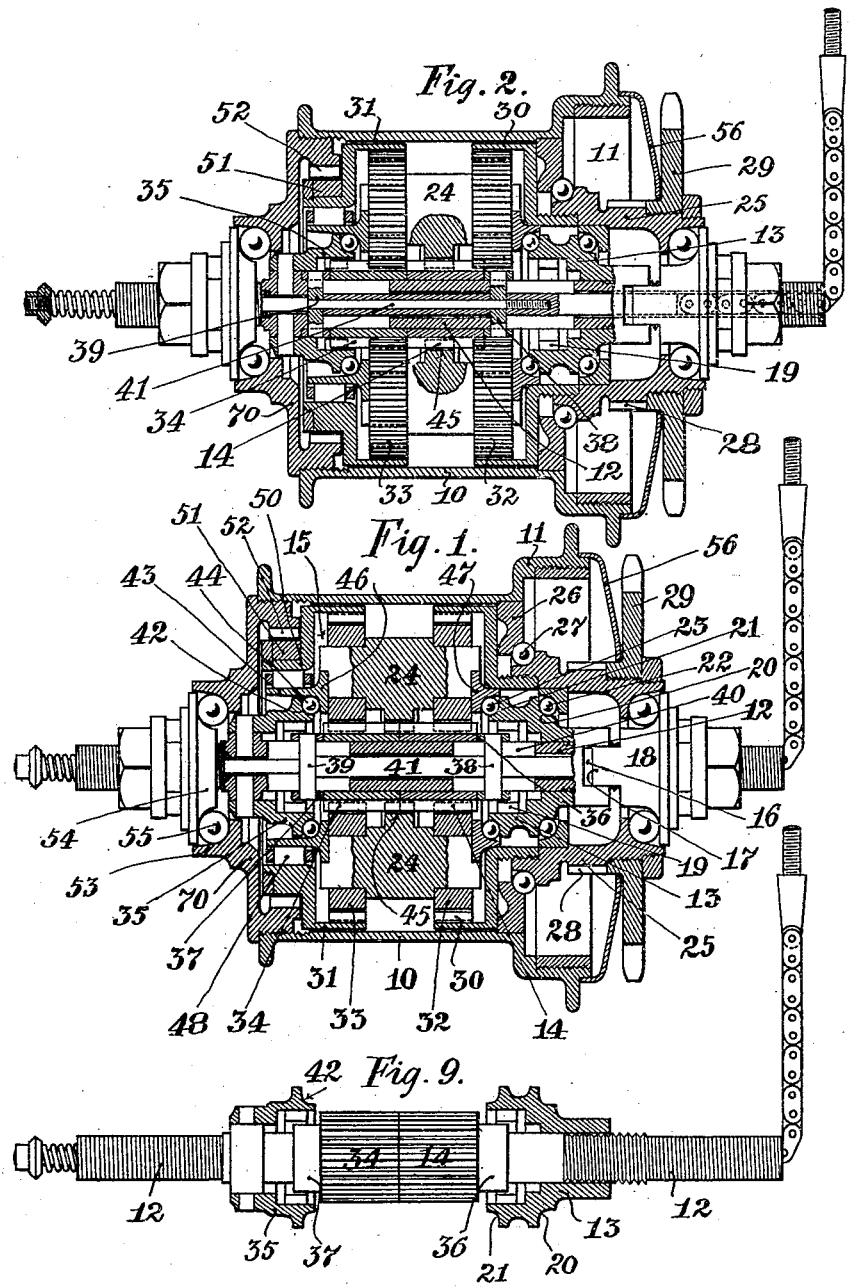

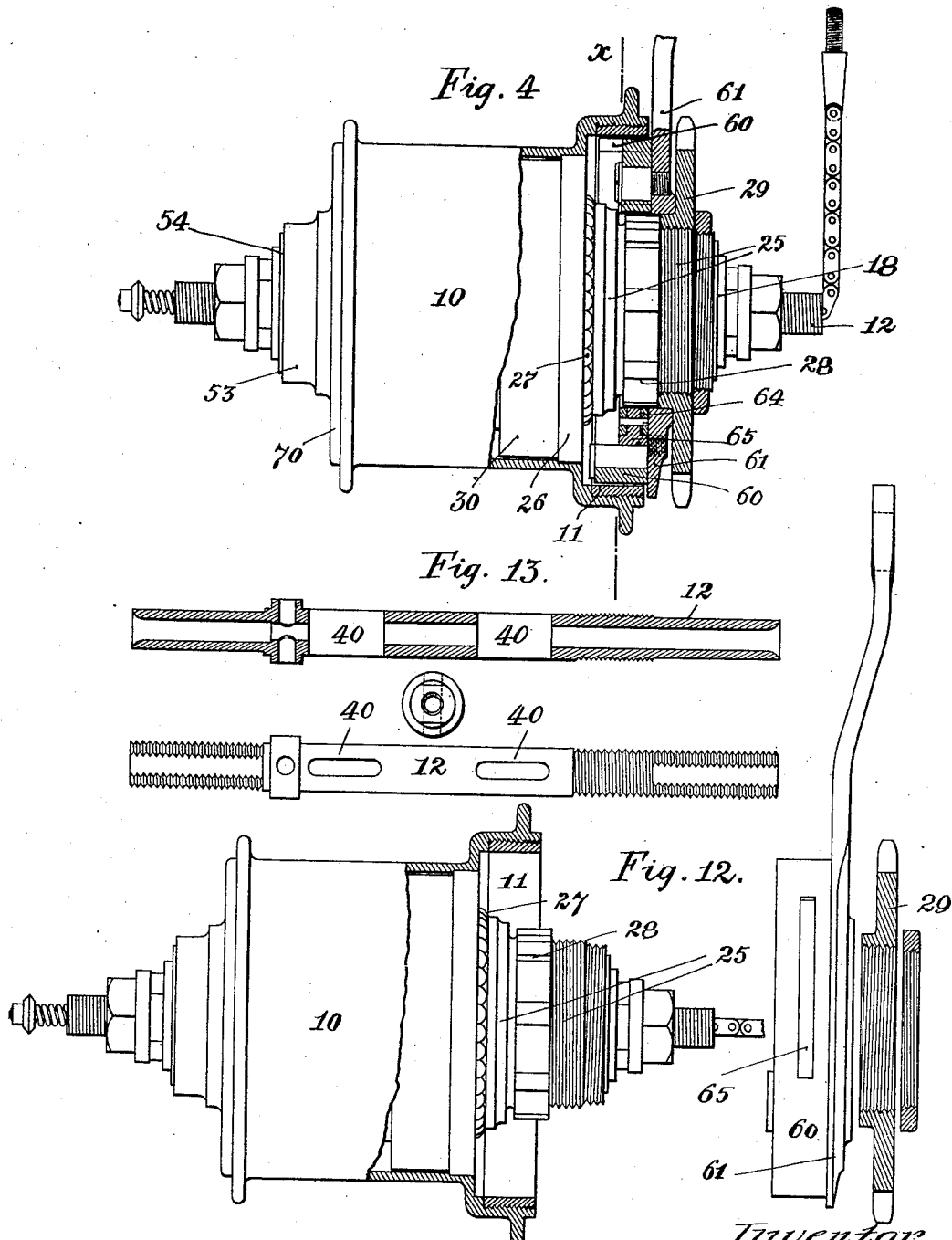

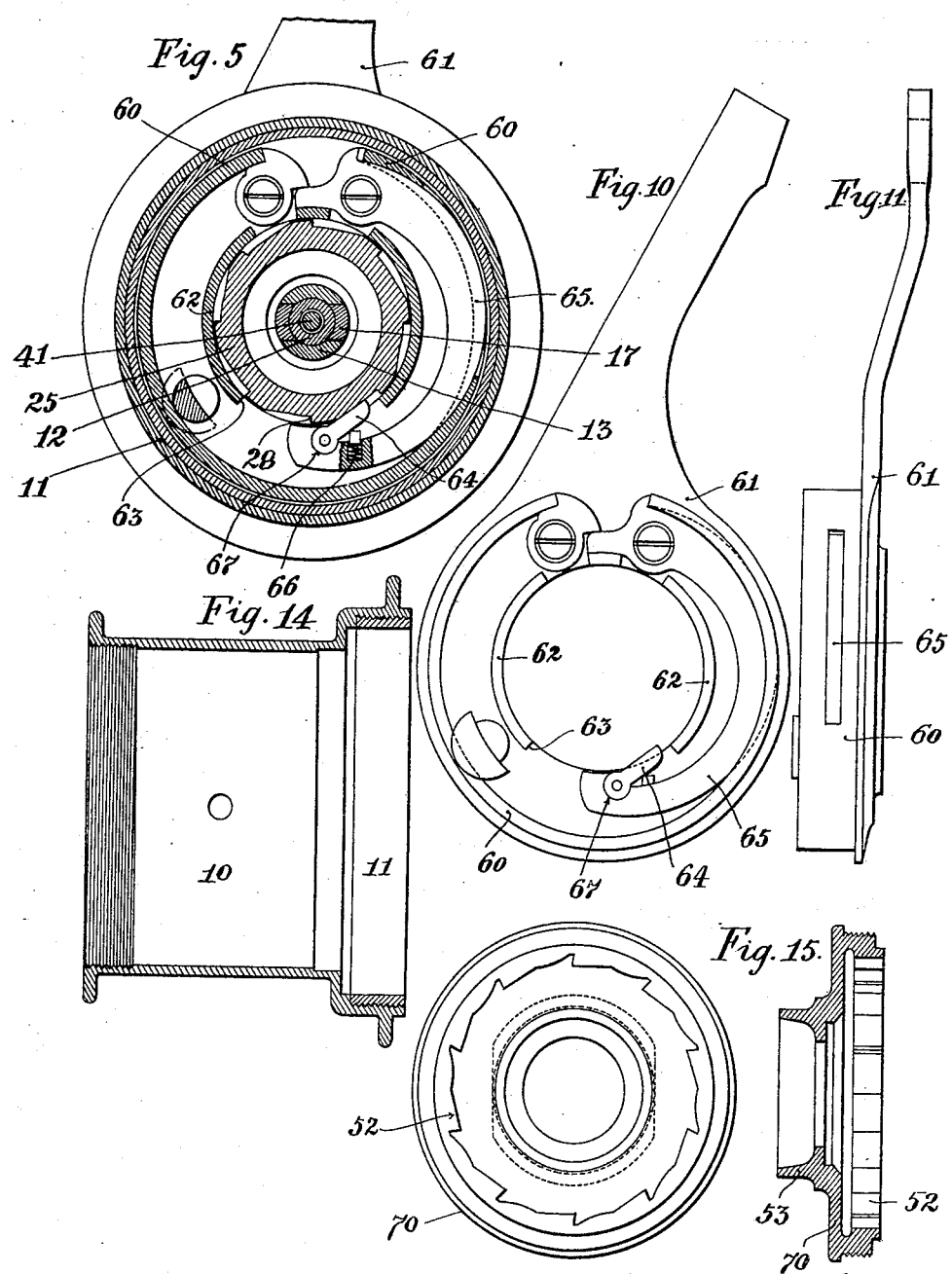

C. T. B. SANGSTER.
CHANGE SPEED AND BACK PEDALING BRAKE MECHANISM FOR CYCLES.
APPLICATION FILED JAN. 2, 1907.

931,656.

Patented Aug. 17, 1909.
6 SHEETS—SHEET 5.

WITNESSES

Inventor
Charles T. B. Sangster
By
James L. Norris.
Atty.

UNITED STATES PATENT OFFICE.

CHARLES T. B. SANGSTER, OF BOURNBROOK, NEAR BIRMINGHAM, ENGLAND.

CHANGE-SPEED AND BACK-PEDALING BRAKE MECHANISM FOR CYCLES.

No. 931,656.    Specification of Letters Patent.    Patented Aug. 17, 1909.

Application filed January 2, 1907. Serial No. 350,447.

*To all whom it may concern:*

Be it known that I, CHARLES THOMAS BROCK SANGSTER, subject of the King of Great Britain, residing at Dale Road, Bournbrook, near Birmingham, England, have invented certain new and useful Improvements in Change-Speed and Back-Pedaling Brake Mechanism for Cycles, of which the following is a specification.

My invention has relation to change speed driving and brake mechanism for cycles, and consists of a hub mechanism which can be arranged to give two, three or four different speeds and to be optionally used either as a change-gear alone or in combination with a back pedaling brake; the same affording, in every case, an automatic free-wheel with practically frictionless running on all speeds, in addition to providing (in the case of a coaster hub combination) for the actuation of the brake by power which is transmitted direct from the sprocket to the braking mechanism, whereby all parts of the gearing and of the free wheel driving clutch of the hub are isolated from and entirely relieved of the stresses which are set up in applying such brake.

By the improved construction a cycle manufacturer or assembler is enabled to make up or adapt hubs of different types or patterns to suit the individual requirements or specifications of his customers and the cost of manufacture is considerably reduced without detriment to the efficiency of the article produced.

I will first describe my invention in its application to a three-speed coaster hub in which the brake part is made in the form of a self contained and removable or interchangeable element; and then proceed to explain in what manner and by what means this construction can be changed or adapted to produce the various other hub gears or combined hub-gears and brakes above referred to.

Figure 16:
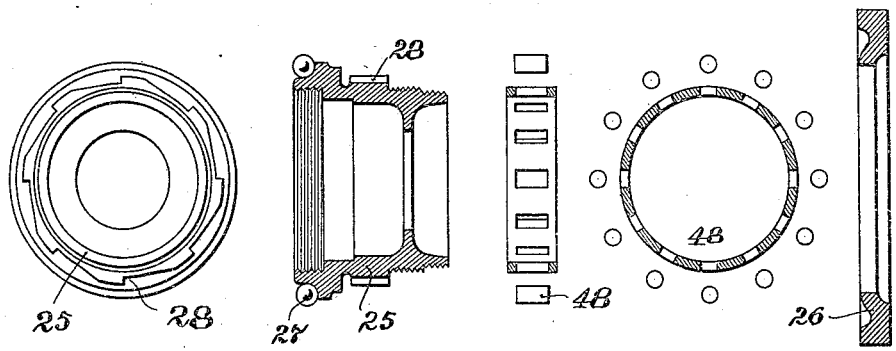
Figure 17:
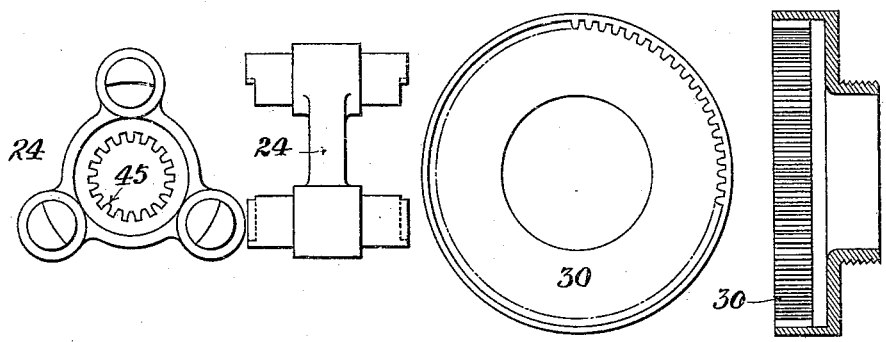
Figure 18:
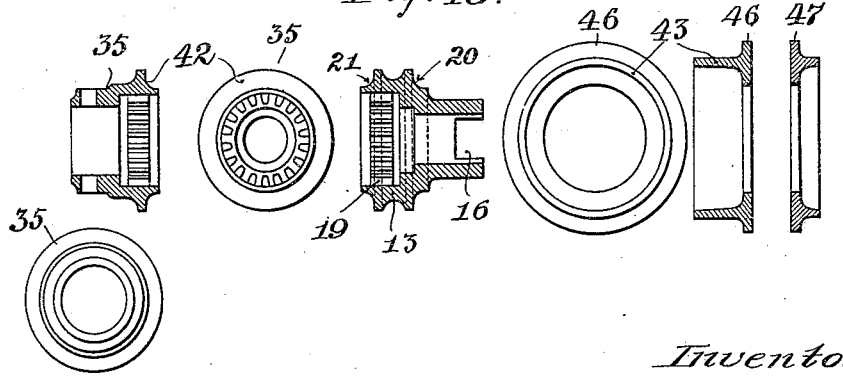
Figure 19:
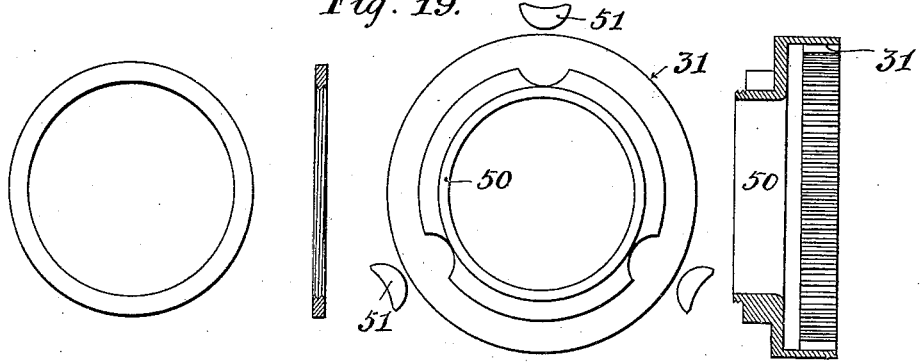
Figure 20:
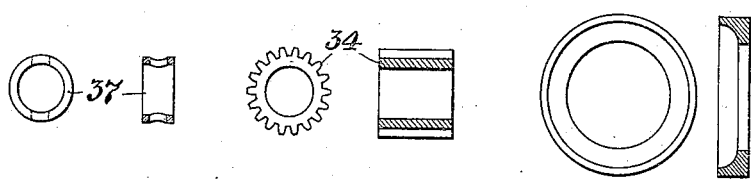
Figure 21:
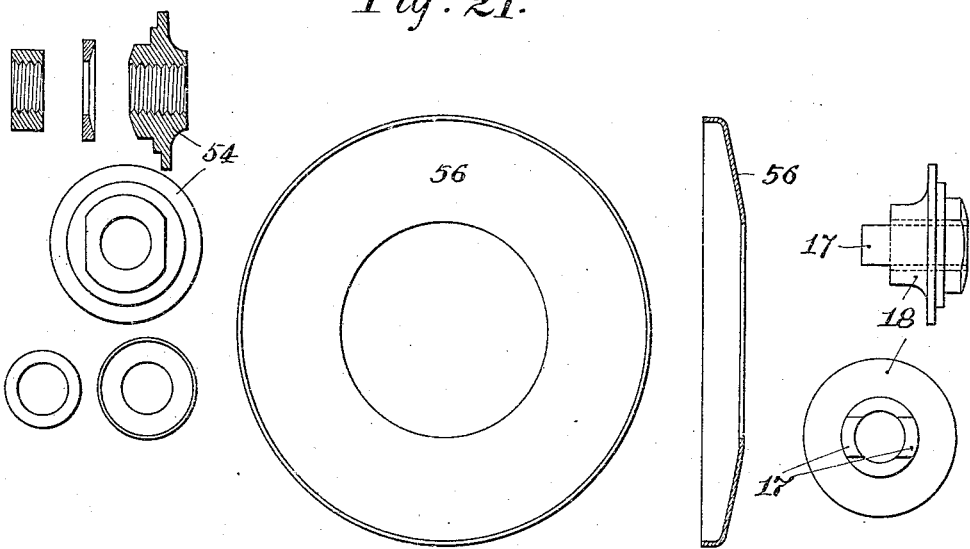

Figure 1 of the accompanying drawings shows a longitudinal sectional view of the three speed hub arrangement with the parts in the positions in which they are placed for driving on the normal or middle speed. Fig. 2 shows the positions in which the parts are placed to render the high speed train operative. Fig. 3 shows the parts in the low speed positions. Fig. 4 shows the self-contained brake device applied to the sprocket extension sleeve which constitutes the primary driving element of the hub. Fig. 5 is a cross section of Fig. 4 upon the dotted line $x$. Fig. 6 is a cross section of the hub upon the dotted line $x^1$ Fig. 3. Fig. 7 is an end elevation and Fig. 8 a side view of the combined cage and clutch separately. Fig. 9 is a view showing the arrangement of the slidable sun-wheels and the clutch-caps which are secured to the hub axle and are adapted to be respectively engaged by the said sun-wheels. Figs. 10 and 11 show an inside elevation and an edge view of the self-contained brake element separately. Fig. 12 is a view illustrating the manner in which the said brake element is applied to the geared hub. Figs. 13 to 21 show various views of the several component parts of the hub separated or disassembled from one another.

The same characters of reference indicate corresponding parts in the several figures of the drawings.

In the arrangement represented in these figures, there is formed at the right hand end of the hub shell 10, a drum or enlargement 11 which constitutes a brake chamber when the hub has a brake element combined with it as shown in Figs. 4 and 5 and the corresponding part of the right end of the axle 12 carries a combined adjustable bearing cone and clutch-cap 13 whose principal function is to lock the low-speed sun pinion to the said axle as hereinafter described. This cone and clutch element is mounted on the axle in such a manner that it is free to move longitudinally for adjusting certain of the bearings, but is incapable of rotatory movement so that it may serve as the medium whereby the sun-wheel 14 of the low speed train 15 may be clutched to the axle when it is desired to render the said train operative. Thus, the said element 13 is provided at its outer end with a pair of gaps or notches 16 which are engaged respectively by tongue extensions 17 at the inner end of a screwed-on adjustable cone 18, so that when said cone is rotated the key connection established by the engaging parts 16 and 17 compels the element 13 to also turn so that all the bearings at the right hand end of the hub are simultaneously adjusted. The said part 13 is provided with a series of internal clutch teeth 19, adapted to be engaged by the teeth of the slidable sun-wheel 14, while externally the cone is formed with a pair of parallel ball races 20, 21, for carrying two rings of balls 22, 23, the inner set 23 of which are adapted to serve as bearings for right hand end of the planetary pinion cage or carrier 24, while the outer set form one of the bearings of the sprocket sleeve 25 the other bearings of said sleeves being arranged at 26, between a cup in its outer end and the cone 18.

The sprocket sleeve 25 is arranged concentrically within the brake chamber of the hub-shell and its concentricity is preserved by fitting into the corresponding end of the shell body inward of the said brake chamber, a closure-plate 26, between which the said sprocket sleeve ball bearings 27 are interposed, the closure also serves to keep the parts of the epicyclic gear train in their relative positions.

To provide for the actuation, when required, of an expanding band type back pedal brake and to admit of the use of a self-contained brake attachment which includes one of the elements of the brake actuating clutch system the sleeve is formed with ratchet teeth 28, while for the purpose of taking the drive direct from the sprocket wheel 29 to the gear system, the said sprocket sleeve is rigidly connected to the internal toothed driving element 30 of the multiplying or high gear train.

The double epicyclic train by which the range of three different speeds is provided for, consists of two internal toothed rings or annular gear elements 30, 31 located respectively in the opposite ends of the hub-shell body, two sets of planetary pinions 32, 33 mounted in a single cage 24, and constantly meshing respectively with the said annular gears, two sun-wheels 14, 34 mounted on the axle 12 and adapted to be slid to and fro collectively but to be capable of independent rotation thereon, two clutch devices 13, 35 whereby either the one or the other of the said sun wheels may be locked to the axle or be both left free to revolve in unison thereon and a further clutch device for locking both sun wheels to the planetary pinion cage when they are disassociated from the axle, or for locking either sun - wheel alone to the said cage when its fellow is locked to the axle.

Any suitable clutch devices may be used for changing or modifying the action of the duplex gear train in the well-known manner for obtaining the low speed drive or reducing action when the right hand sun-wheel 14 is locked to the axle (see Fig. 3) but is free of the cage and the left-hand gear train is locked up solid by the placing of its sun-wheel in a position in which it is clutched with the pinion cage and while still in engagement with its planet pinions and free of the axle, or for obtaining the high-speed drive when the left hand sun wheel 34 is locked to the axle (see Fig. 2) and the right hand sun wheel is locked up solid by the engagement of its sun wheel with the cage, or for obtaining a direct drive on the normal or middle speed when both gear trains are locked to the pinion cage by freeing both sun wheels from the axle and clutching or locking them with the cage as shown in Fig. 1, but preferably I employ the sun-wheel and clutch system represented in the drawings which is arranged as follows:—

The two separate sun wheels 14, 34, are arranged to rotate independently but slide collectively upon the hollow and slotted axle 12, and are held together endwise by means of a pair of confining rings 36, 37 which are permanently connected, at a fixed distance apart by pins 38, 39, which are directed through the slots 40 in the axle and are secured to a striking rod 41, which is connected with any suitable gear-striking mechanism whereby the coupled wheels may be drawn into and held in the appropriate positions for obtaining the different actions of the gearing as above described.

For locking the right-hand sun wheel to the axle, I preferably use the combined adjusting cone and clutch 13, already referred to and arrange for the outer end of the said wheel to be engaged with the clutch teeth of the said device as shown in Fig. 3, such teeth being made of a length that will insure their effective engagement with the said sun-wheel irrespective of the adjusted position of the cone while to provide for the locking of the left-hand sun-wheel I use a combined cone and clutch 35, which I positively fix to the axle and arrange the same so that, in addition to being engaged by the left-hand sun-wheel for rendering the high-speed train operative, it will also constitute a fixed abutment for taking any end thrust that may be applied to the gears and a fixed point up to which the whole of the gear bearings can be adjusted. The inner side of the cone is formed with a ball race 42, which is opposed to a similar race in the inside of a sleeve-like extension 43, of the pinion cage 24, and balls 44, are interposed between the said races.

The clutch device for locking both sun-wheels to the pinion cage or carrier when they are free of the axle is preferably made by forming around a hole in the body part of the said cage, a ring of clutch teeth 45, of suitable length to insure that when the coupled sun-wheels are placed in their midway or intermediate position, as shown in Fig. 1, their meeting ends shall both be engaged by the said clutch teeth, but when the said wheels are drawn or pushed over to either the low-gear or the high-gear position, as the case may be, the inner end of the one wheel shall be moved further into the cage clutch although it still remains in mesh with its planet pinions, whereas the other wheel is completely cleared from the said cage clutch but is engaged with the internal clutch teeth of the appropriate non-rotatable bearing cone and is thereby locked to the axle for rendering the corresponding gear train operative.

The pinion cage is confined laterally between the bearing cones on the axle, but the ball bearings upon which it is mounted reduce the internal friction to a minimum when the said cage is revolving as it does when drive is being transmitted although it is stationary during free-wheeling. The cage consists of a middle plate provided centrally with the cage clutch 45 above described and having a series of radial arms each of which has fixed to it a pair of pinion-supporting studs whose outer ends are connected to rings 46 47, which complete the cage-structure and retain the loose pinions upon their respective studs, and are also formed with races to contain the ball bearings on which the said cage is mounted. The pinions of the high-gear train mesh with and transmit the drive to the internal gear element 31, and in order to provide an anti-friction support for this element, which revolves at a relatively faster rate than the cage itself when the high-speed train is operative, an anti-friction bearing such as 48 is interposed between the cage extension 43 and the concentric extension 50 of the internal gear 31.

The final transmission of the drive from the gear-element 31, to the hub-shell is effected through a clutch 51, 52, interposed between the said element 31, and a plate 70, which is screwed to the hub-shell and carries a ball-raced cup 53, to coöperate with a cone 54, on the axle for containing the left-hand hub-shell bearing 55. This clutch constitutes the only connection between the internal gear and the hub shell so that when discontinued the said shell will over-run the said mechanism (whichever gear train is operative or in service) without imparting any motion whatsoever thereto, and thus considerable wear and tear is obviated.

The three-speed gear and free-wheel clutch arrangement above described is complete and self contained and is adapted to be optionally used either alone as shown in Figs. 1 to 3, or in combination with a self-contained and detachable back-pedaling brake element as shown in Figs. 4 and 5. In the former case, the outer end of the brake-chamber 11, is closed by a plate 56, but when the brake combination is desired, then the brake device Figs. 10 and 11, is applied to the said brake chamber in such a manner that the part of brake-actuating clutch which is carried by it will engage with the ratchet clutch teeth 28 on the sprocket sleeve.

In the expanding-band type brake represented in the drawings, the band 60, is mounted upon a fulcrum plate 61, which is adapted to be secured by a clip to the frame of a machine and is formed with a central bush 62 which, when the brake element is in position within the end chamber of the hub, will surround the middle of the sprocket sleeve and be confined laterally between an annular shoulder on the side sleeve and the chain wheel which is made to screw on to and off the driving piece to enable the said brake element to be laterally introduced into or removed from the brake chamber and to be laterally held in place by the said wheel when the latter is in position. The central bush of the fulcrum plate then surrounds the ratchet clutch teeth 28, and gaps or clearances 63, are formed in said bush to admit of an effective engagement being made between said teeth 28, and the complementary clutch element 64, which is carried by a curved lever 65, whose function is to act upon the ends of the brake band, either directly or by cones or the like, and to expand the same into frictional contact with a ring in the inside of the brake-chamber when the sprocket sleeve is turned in a backward direction. The clutch element 64, consists of a pawl piece which is pivoted on the extremity of the brake-expanding lever and is arranged so that it is kept, by a suitable spring 66, in contact with the ratchet teeth 28, which wipe idly under the said pawl piece so long as forward drive is being transmitted but become engaged with same and actuate the brake lever therethrough when the motion of the sprocket sleeve is reversed by back-pedaling. The pivot end of the pawl piece is arranged within a seating 67, which backs up and provides a solid bearing for the said pawl and takes the strain off its pivot.

The self contained coaster brake element may be applied to this modified or converted form of the mechanism in the same manner as to the other forms or modifications already mentioned.

Having fully described my invention, what I desire to claim and secure by Letters Patent is:—

1. In a device of the class specified, a change speed hub of the double epicycloidal train class comprising a pair of gear trains, a combined planetary pinion cage and clutch device carrying the planetary pinions of both trains, a pair of collectively slidable and independently rotatable sun wheels coöperating therewith, a fixed axle carrying a pair of sun wheel clutches each adapted to coöperate with one of said sun wheels, a driving member associated with the driving element of the first gear train, a brake device detachably connected to the shell at one end thereof and engaging the shell when actuated, means carried by the driving member adapted to actuate the brake mechanism when the driving member is moved in a reverse direction and a free wheeling clutch arranged between the driven element of the second gear train and the other end of the shell adapted to permit the shell to overrun the gear train when the latter is held stationary.

2. In a change speed hub comprising the combination with a fixed axle and a revolving planetary pinion case, of sun wheel clutching devices carried on said axle and provided with means to constitute external ball races for the reception of bearing elements to support the cage.

3. In a change speed hub, a hub shell, a driving element, a driven element, a gear train arranged between the driving element and the driven element, a clutch device arranged between the driven element and the hub shell, operative upon the movement of the gear train in a forward direction to clutch the driven element to the brake shell at one end thereof and adapted to permit the shell to overrun the gear train when the train is held stationary, a brake device detachably arranged between the driving element and the brake shell at the other end of the shell and means associated with the driving element to actuate the brake mechanism when the driving element is moved in the reverse direction.

4. In a device of the character specified, a hub shell, a fixed axle, a pinion cage mounted on the axle and carrying two sets of planetary pinions, means to lock either of said sets of planetary pinions and the cage to the axle, a driving element geared to one of said sets of pinions, a driven element geared to the other set of pinions, and a clutch device between the driven element and the hub shell operative when the driving element is moved in one direction to impart movement from said driven element to the shell.

5. In a change speed hub of the double epicycloidal train class the combination with a self-contained brake element of a brake drum, of a lever for expanding the drum having a pawl, a pair of gear trains, a combined planetary pinion cage and clutch device carrying the planetary pinions of both trains, a pair of collectively slidable and independently rotatable sun wheels coöperating therewith, a fixed axle, a pair of sun wheel clutches carried by a fixed axle, a sprocket extension member connected with the driving elements of the first gear train and adapted to be engaged by said pawl when the brake is fitted to the hub, a member secured to the shell, and a free wheeling clutch interposed between the driven elements of the second gear train and said member.

6. In a change speed hub, in combination, a sprocket wheel provided with an extension, a hub shell, a gear train, a one-way free wheeling clutch serving as the only connection between the shell of the hub and the train and adapted to permit of holding the whole of the train stationary when the hub shell is over-running, a brake device embodying a drum and a lever for expanding the same, and a second clutch interposed between the brake device and said extension and provided with means whereby the direct actuation of the brake from the sprocket wheel can be had.

7. In a device of the class specified, a hub shell, an annular toothed driven element at one end of the shell, an annular toothed driving member at the other end of the shell, a non-rotatable axle, a pinion cage rotatably mounted on the axle, two sets of planetary gears carried by the pinion cage, one of said sets of gears engaging the teeth of the driven element and the other engaging the teeth of the driving element, means associated with the axle to engage said cage and either of said sets of planetary gears, and a clutch between the driven element and the hub shell operative upon the movement of the driving element in one direction to impart movement from the driven element to said shell, and to permit the shell to overrun the driven element when the latter is held stationary.

8. In a change speed hub, a driving element, a driven element, a rotatably mounted cage carrying a pair of sets of pinions, one of said sets of pinions engaging the driving element and the other the driven element, a pair of rotatable and shiftable devices, each adapted when shifted to lock said cage and one of said sets of pinions together, and a pair of devices each adapted to engage one of said locking devices when shifted to secure it against rotation, said last named devices also serving to antifrictionally support the cage and being movable toward and away from the other to provide for adjustment of the cage bearings.

9. In a change speed hub, a hub shell, a pair of internally toothed rings, a fixed axle, a pinion cage, a pair of sets of pinions carried by said cage each set adapted to engage one of said toothed rings, a pair of sun wheels shiftable and independently rotatable on the axle each of said sun wheels meshing with one of the sets of pinions and adapted when shifted to engage said cage, means to clutch said sun wheels to the axle, driving means for one of said rings and a clutch device between the other ring and the shell operative when the driving element is moved in one direction and connecting said ring to the shell.

In testimony whereof I have hereunto set my hand in presence of two subscribing witnesses.

CHARLES T. B. SANGSTER.

Witnesses:
FRANK S. SIMMONDS,
ARTHUR SADLER.